UNITED STATES PATENT OFFICE.

PAUL FLEMMING, OF HAMBURG, GERMANY.

PROCESS FOR THE PRODUCTION OF DISINFECTANTS.

1,096,361. Specification of Letters Patent. Patented May 12, 1914.

No Drawing. Application filed March 21, 1912. Serial No. 685,287.

*To all whom it may concern:*

Be it known that I, Dr. PAUL FLEMMING, chemist, citizen of Germany, subject of the German Emperor, residing at the free town of Hamburg, in the State of Hamburg and Empire of Germany, have invented new and useful Improvements in Processes for the Production of Disinfectants, of which the following is a specification.

Phenol, cresol and their homologues possess acid qualities which become still further increased by the introduction of halogen atoms. Thus for example phenol pentachlorid dissolves in cold soda or potash solution. It must therefore be regarded as unusually surprising that the alkali salts not only of phenol and cresol but also of their halogen substitution products are capable of forming compounds soluble in water with fats and oils at ordinary temperature. It has even been shown that in place of normal even acid alkali salts may be employed produced in accordance with U. S. Patent 775,814 and U. S. Patent application Ser. No. 654,273.

It is not necessary in all cases to proceed from a uniform phenol derivative, on the contrary mixtures of salts also are employed such as can be produced directly from technical mixtures, for example, the so called crude carbolic acid of commerce and the like.

In order to mix salt and fat together and thus bring about the reaction, a suitable organic dissolving medium such as alcohol may be added.

The process is illustrated in a series of examples as follows:—

Example 1: 120 grams linseed oil, 60 grams potassium cresylate, 20 grams water are allowed to stand at ordinary temperature and yield a homogeneous liquid which is soluble in water.

Example 2: 30 grams, castor oil, 32.3 grams double compound of p-chlor-potassium-m-cresylate and p-chlor-m-cresol, 5 grams water are allowed to stand at ordinary temperature and yield a homogeneous liquid which is soluble in water.

Example 3: 30 grams castor oil, 47 grams of double compound of p-chlor-sodium-m-cresylate and p-chlor-m-cresol, 8 grams alcohol are allowed to stand at ordinary temperature and yield a transparent, soft mass which is soluble in water.

Example 4: 30 grams castor oil, 47 grams double compound of potassium p-cresylate and p-cresol, 10 grams alcohol are allowed to stand at ordinary temperature and yield a homogeneous liquid which is soluble in water.

Example 5: 60 grams potassium chlorcresylate, 98 grams linseed oil, 15 grams water are allowed to stand at ordinary temperature and yield a homogeneous liquid which is soluble in water.

Example 6: 60 grams potassium bromocresylate, 82 grams castor oil, 15 grams water, are allowed to stand at ordinary temperature and yield a homogeneous liquid which is soluble in water.

Example 7: 58 grams potassium chlor-m-cresylate, 90 grams lard, 5 grams water, are allowed to stand at ordinary temperature and yield then a homogeneous fluid which is soluble in water.

Having now described my invention what I claim and desire to secure by Letters Patent of the United States is:

1. The process of making disinfectants soluble in water which consists in bringing together at ordinary temperature an alkali salt of a phenolic compound, a dissolving agent for said salt, and a glycerid.

2. The process of making disinfectants soluble in water consisting in bringing together at ordinary temperature an alkali salt of a halogen substituted phenol and a glycerid.

3. The process of making disinfectants soluble in water which consists in bringing together at ordinary temperature an alkali salt of a phenolic compound, a dissolving agent for said salt, and a glycerid, the quantity of the alkali salt employed being such that the alkali contained therein will be sufficient to saponify the employed quantity of said glycerid.

In testimony whereof I have hereunto set my hand in presence of two subscribing witnesses.

Dr. PAUL FLEMMING.

Witnesses:
 ERNEST H. L. MUMMENHOFF,
 IDA CHRIST. HAFERMANN.